US009688359B2

(12) United States Patent
de Poorter et al.

(10) Patent No.: US 9,688,359 B2
(45) Date of Patent: Jun. 27, 2017

(54) VESSEL COMPRISING A SPUD

(71) Applicant: IHC Holland IE B.V., Sliedrecht (NL)

(72) Inventors: Marinus Johannes Cornelis de Poorter, Roosendaal (NL); Dingeman Van Woerden, Gouda (NL)

(73) Assignee: IHC Holland IE B.V., Sliedrecht (NL)

( * ) Notice: Subject to any disclaimer, the term of this patent is extended or adjusted under 35 U.S.C. 154(b) by 40 days.

(21) Appl. No.: 14/396,421

(22) PCT Filed: Apr. 23, 2013

(86) PCT No.: PCT/NL2013/050303
§ 371 (c)(1),
(2) Date: Oct. 23, 2014

(87) PCT Pub. No.: WO2013/162360
PCT Pub. Date: Oct. 31, 2013

(65) Prior Publication Data
US 2015/0084647 A1 Mar. 26, 2015

(30) Foreign Application Priority Data
Apr. 24, 2012 (NL) ..................................... 2008694

(51) Int. Cl.
*B63B 21/26* (2006.01)
*E02F 9/06* (2006.01)
(Continued)

(52) U.S. Cl.
CPC .............. *B63B 21/50* (2013.01); *B63B 21/26* (2013.01); *B63B 21/507* (2013.01); *E02F 9/06* (2013.01);
(Continued)

(58) Field of Classification Search
CPC ....... B63B 21/26; B63B 21/507; B63B 21/50; E02F 9/062; E02F 9/06; G01B 7/003
(Continued)

(56) References Cited

U.S. PATENT DOCUMENTS

| 3,648,998 | A | | 3/1972 | Van Der Gaag | |
| 4,385,297 | A | * | 5/1983 | Schmitt | G01B 7/14 324/207.16 |

(Continued)

FOREIGN PATENT DOCUMENTS

| EP | 2 258 904 | 12/2010 |
| JP | 56 047386 | 4/1981 |

(Continued)

OTHER PUBLICATIONS

International Search Report dated Jul. 17, 2013, corresponding to PCT/NL2013/050303.
(Continued)

Primary Examiner — Son Le
Assistant Examiner — Akm Zakaria
(74) Attorney, Agent, or Firm — NLO N.V.; Catherine A. Schultz; Minerva Rivero

(57) ABSTRACT

A vessel (1) includes a spud (10), a spud lifting device (20) and a plurality of spud guiders (30). The spud guiders (30) are arranged to hold the spud (10) in a substantial vertical orientation and guide the spud (10) when moving in a substantial vertical direction between a lower position in which it can engage with a water bottom and an upper position. The spud lifting device (20) is arranged to lift the spud (10) from the lower position to the upper position. The vessel (1) further includes a spud position detector (40) to detect passage of the lower end (11) of the spud (10) along one or more spud detection points at predetermined heights.

7 Claims, 2 Drawing Sheets

(51) Int. Cl.
*B63B 21/50* (2006.01)
*G01B 7/00* (2006.01)
*B63B 21/00* (2006.01)

(52) U.S. Cl.
CPC .............. *E02F 9/062* (2013.01); *G01B 7/003* (2013.01); *B63B 2021/003* (2013.01)

(58) Field of Classification Search
USPC ......................................................... 324/654
See application file for complete search history.

(56) References Cited

U.S. PATENT DOCUMENTS

| | | | | |
|---|---|---|---|---|
| 5,791,074 A | * | 8/1998 | Pryor | ..................... B63B 21/50 37/312 |
| 6,490,227 B2 | * | 12/2002 | Nagai | ...................... B66F 9/20 367/99 |
| 2009/0126237 A1 | * | 5/2009 | Clymans | ................. F28F 1/325 37/317 |

FOREIGN PATENT DOCUMENTS

| | | | |
|---|---|---|---|
| JP | 5647386 | | 4/1981 |
| JP | 56047386 A | * | 4/1981 |
| JP | 10 310378 | | 11/1998 |
| JP | 2005-067793 | | 3/2005 |
| NL | 6905248 A | | 10/1970 |

OTHER PUBLICATIONS

Chinese Office Action dated Dec. 9, 2015, with English Translation; Application No. 2013800333709.

* cited by examiner

VESSEL COMPRISING A SPUD

TECHNICAL FIELD

The invention relates to a vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position. The invention further relates to a method of determining the vertical position of a spud on a vessel, the vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position.

BACKGROUND

A spud is a pile that is used by dredging vessels and which engages with the bottom of a water column in order to provide a fixed point for such a dredging vessel during dredging. The spud, also referred to as spud-pile, has a substantial vertical orientation and is subjected to loads, in particular resulting from the dredging process and the movements of the vessel. The vessel may be able to move with respect to the spud. In practice, a spud weighs between a few dozen tons and 200 tons. The spud may be made of steel and may comprise drain holes and holes for receiving locking pins.

The spud may be lowered to engage with the water bottom. This may be done by simply releasing the spud such that it falls to the water bottom. The lower end of the spud may be formed as a sharp end to penetrate the water bottom. Lifting means are provided for lifting the spud.

A plurality of spud guiders may be provided at different heights and are connected to the dredging vessel for accommodating the spud and guiding the spud when it is lowered or lifted. The spud guiders may be provided on the outside of the dredging vessel. For instance, three spud guiders may be provided, while the spud needs to be supported by at least two spud guiders to prevent loosing the spud.

In order to provide the vessel with an improved freedom of movement, the spud guiders may be provided on a spud carriage which can move relative to the hull of the vessel in a horizontal direction.

If the spud is lifted too much, it may reach a position in which it is no longer supported by enough spud guiders. The spud may than exert too much force on the spud guider(s) still supporting the spud, which may damage the spud guiders and may result in falling over of the spud, possibly onto the dredger.

Therefore, monitoring the position of the spud during lifting is needed.

It is noted that the vertical position of the spud is difficult to predict. In the first place the depth of the water bottom may not be known accurately and also it is difficult to know how far exactly the spud has penetrated the water bottom. Also, as the spud may rotate about is longitudinal body axis, locking holes provided in the spud for receiving locking pins may be difficult to trace and are therefore difficult to use to determine the vertical position of the spud.

As the spud is made of steel and the guiding elements and the dredging vessel are usually also made of steel, or at least comprise steel, detection of the position of the spud by detecting the presence or absence of steel is relatively difficult.

NL6905248A and EP2258904A1 describe spud systems known from the prior art. However, these documents do not describe how to accurately detect the presence or absence of steel to prevent lifting the spud too much.

JP-A-56047386 describes a method which relies a plurality of height measurements such as a height between the spud and the sea bottom and a lifting height and performs calculations based on these measurements. This approach is vulnerable to measurements errors, which could result in an erroneous calculated position of the lower end of the spud which could introduce the risk of lifting the spud too much.

JP-A-10310378 describes the use of two photoelectric sensors which monitor shift length of the vertically moved spud by sensing passage of projections and recesses. This device is also vulnerable to measurements errors. Measurement errors may result in an erroneous calculated position of the spud and thus in an erroneous position of the lower end of the spud.

SUMMARY

It is an object to provide a spud position detection system that prevents lifting the spud too much.

Therefore, according to an aspect there is provided a vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position characterized in that the vessel further comprises a spud position detector to detect passage of the lower end of the spud along one or more spud detection points positioned at predetermined heights.

The upper position may also be referred to as a transport position, a position in which the spud is lifted from the water bottom and which is high enough to allow the vessel to sail safely.

By directly detecting passage of the lower end of the spud a simple and reliable spud position detector is provided. Such a spud position detector is more reliable than detectors which rely on a plurality of height measurements or detectors which rely on continuous cumulative measurements of vertical motions of the spud.

According to an embodiment the spud position detector comprises at least one coil positioned at the one or more spud detection points to detect passage of the lower end of the spud. The coil may also be referred to as an electromagnetic coil or induction coil. It has been found that using coils is a reliable way to determine the presence or absence of a spud and thus also the passage of the end of a spud. The parameters of the coil may be chosen carefully in order to increase the reliability of the system.

The coils are positioned along the vertical path of the spud, which is defined by the spud guiders.

The coils may be provided with a direct voltage, for instance a voltage of 24 V. The impedance of the coils and change thereof may be measured to detect passage of a lower end of a spud.

The coils may be dimensioned such that they function in cooperation with standard spuds, having diameters up to 900 mm, for instance spuds from the series B30-B65DDSP of IHC Merwede.

The coils may comprise 20-40 turns, for instance 31 turns, have an outer diameter in the range of 240-275 mm, for instance 260 mm±2 mm, a coil inner diameter in the range of 200-250 mm, for instance 220 mm±2 mm, a coil wire thickness in the range of 1-4 mm$^2$, for instance 1.5 mm$^2$±0.005 mm$^2$. The coil may be positioned in a protective, waterproof, coil housing made of a suitable waterproof, rust-resistant material, such as plastic. In case two or more spud detection points are provided each having at least one coil, all coils may be positioned in one and the same coil housing.

As a result of lubrication tolerance, the spud has a small amount of lateral freedom of movement. The position of the coil housing should be chosen carefully to take this freedom of movement into account. The minimal distance from the coil housing to spud is in the range of 10-30 mm, for instance 20 mm±5 mm. The maximum distance from the coil housing to spud is in the range of 50-80 mm, for instance 70 mm±5 mm.

By using coils with such dimensions, reliable detection of the passage of the spud is ensured, despite the fact that the coil is positioned in the vicinity of other steel materials.

According to an embodiment the coils have a coil axis, which is substantially perpendicular to a body axis of the spud. The body axis of the spud is in use the vertical spud axis. The coil axis may intersect the body axis of the spud or may be perpendicular to such a direction.

According to an embodiment the coils have a coil axis which is substantially parallel to the body axis of the spud.

According to an embodiment at least a stop spud detection point is positioned below a predetermined spud guider and, if present, above a spud guider positioned below the predetermined spud guider. The spud detection point, e.g. the coil, may be positioned close to and below the second highest spud guider. This ensures that when it is sensed that the lower end of the spud passes this spud detection point, lifting may be stopped to ensure that the spud is still held by at least two guiders. However, in general the predetermined spud guider may be the lowest spud guider which is necessary to support the spud in a safe manner.

According to an embodiment the spud position detector is arranged to generate a stop signal when during lifting passage of the lower end of the spud is detected along the stop spud detection point. The stop signal may be an audible and/or visible signal. The stop signal may also be a control signal to the spud lifting device preventing the spud lifting device from further lifting.

According to an embodiment at least one pre-stop spud detection point is positioned below the stop spud detection point. This pre-stop spud detection point may be positioned close to (above, on or below) the third highest spud guider to allow the spud position detector to detect when the lower end of the spud approaches the stop spud detection point.

According to an embodiment the spud position detector is arranged to generate a pre-stop signal when during lifting passage of the lower end of the spud is detected along the pre-stop spud detection point. The pre-stop signal may be an audible and/or visible signal, preferably different from the audible and/or visible stop signal. The pre-stop signal may also be a control signal to the spud lifting device to slow down the spud lifting device.

According to an aspect there is provided a method of determining the vertical position of a spud on a vessel, the vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position characterized by the vessel further comprising a spud position detector to detect passage of the lower end of the spud along one or more spud detection points positioned at predetermined heights, wherein the method comprises detecting passage of the lower end of the spud along a spud detection point by the spud position detector during lifting of the spud. Passage of the lower end of the spud is in particular detected during lifting of the spud.

According to an embodiment the spud position detector comprises at least one coil positioned at the one or more predetermined spud detection points to detect passage of the lower end of the spud and the method comprises energizing the at least one coil. The coil is energized to allow detection of the passage the lower end of the spud.

According to an embodiment at least a stop spud detection point is positioned below a predetermined spud guider and, if present, above a spud guider positioned below the predetermined spud guider, wherein the method further comprises generating a stop signal when during lifting passage of the lower end of the spud is detected along the stop spud detection point.

According to an embodiment at least one pre-stop spud detection point is positioned below the stop spud detection point and wherein the method comprises generating a pre-stop signal when during lifting passage of the lower end of the spud is detected along the pre-stop spud detection point.

BRIEF DESCRIPTION OF THE DRAWINGS

Embodiments will now be described, by way of example only, with reference to the accompanying schematic drawings in which corresponding reference symbols indicate corresponding parts, and in which.

The figures are only meant for illustrative purposes, and do not serve as restriction of the scope or the protection as laid down by the claims.

DETAILED DESCRIPTION

A vessel with a spud lifting device and a spud position detector is provided. The spud position detector is used to prevent the spud lifting device from lifting a spud too much such that is would reach a position in which the spud is no longer held in position by enough spud guiders. The spud guiders are positioned above each other to hold the spud in a substantially vertical orientation and define a vertical spud path.

For instance, in case three spud guiders are provided, it may be the case that the spud should always be supported by at least two spud guiders. If the spud lifting device would lift the spud too much, the spud may reach a position in which the spud is only supported by the highest spud guider, while this spud guider may not be strong enough to hold the spud.

The spud position detector detects when the spud reaches its highest safe position or at least when the spud approaches this highest safe position.

The spud position detector uses at least one spud detection point provided at a predetermined height along the spud path to detect passage of the lower end of the spud. If passage of the lower end of the spud is detected during lifting, the lifting may be stopped. Of course, more than one spud detection point may be provided to monitor the movement of the spud more accurately.

Figure 1:
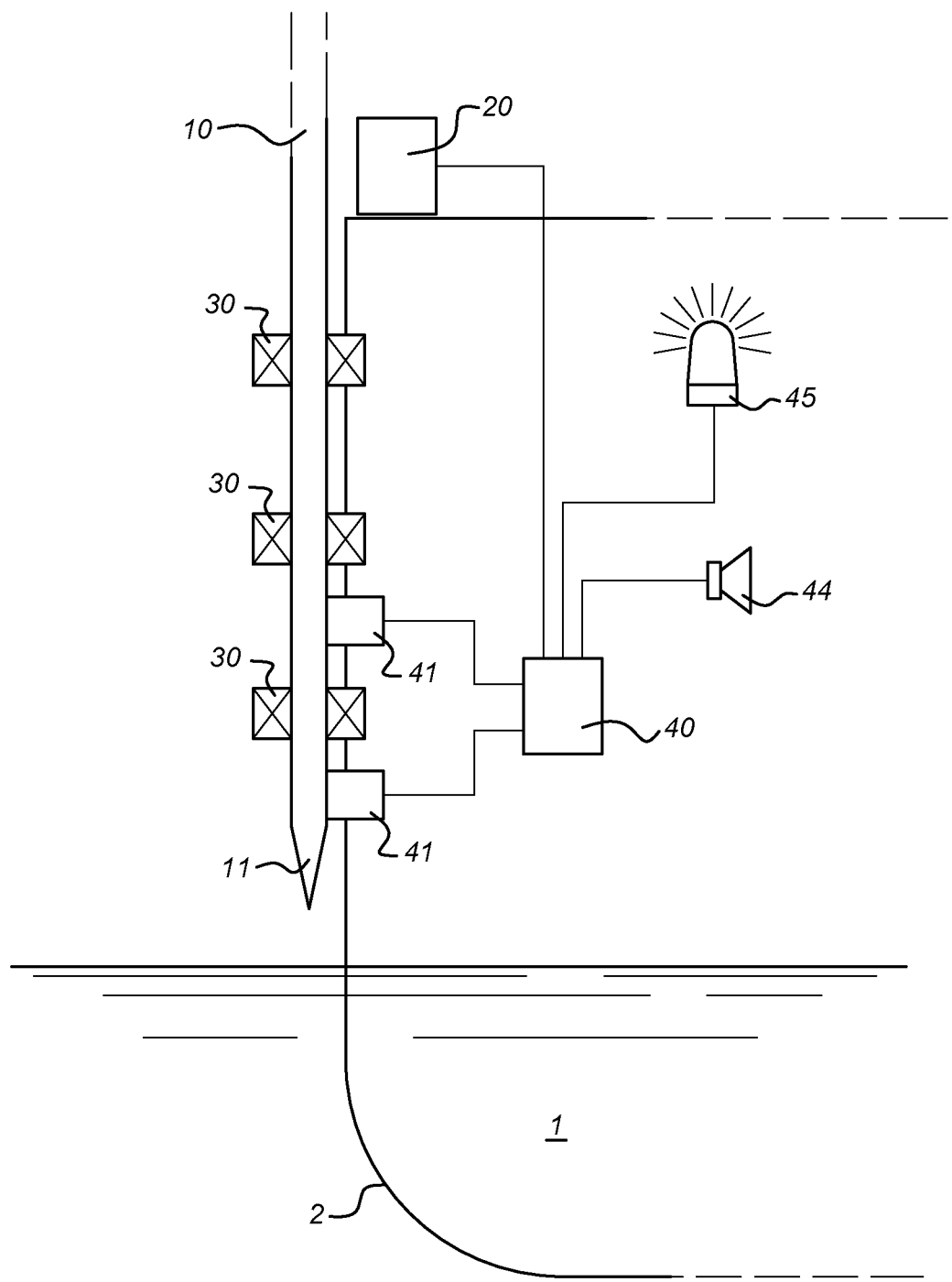
FIG. 1 schematically shows a vessel according to an embodiment.

FIG. 1 shows part of a vessel 1, such as a dredging vessel, comprising a hull 2.

The vessel 1 further comprises a plurality of spud guiders 30, in this example three spud guiders 30, in which a spud 10 may be placed. The spud 10 may move from a lower position, in which it can engage with a water bottom and a upper or storage position, in which it can be placed when the vessel is sailing. The spud 10 may be positioned in the lower position by simply dropping the spud 10. The spud may be dropped from an intermediate position or from the upper position. The spud lifting device 20 is arranged to lift the spud 10.

FIG. 1 shows a vessel 1 which is arranged to hold one spud. However, the vessel 1 may also be arranged to hold two or more spuds 10 next to each other.

The vessel 1 further comprises a spud position detector 40 to detect passage of the lower end 11 of the spud 10 along one or more spud detection points 41 at predetermined heights along the spud path. A plurality of spud detection points 41 may be provided along the spud path which provide information about passage of the lower end 11 of the spud 10 to spud position detector. FIG. 1 shows an embodiment with three spud guiders 30.

In FIG. 1, all the spud detection points 41 are positioned above the water surface. It will be understood that one or more of the spud detection points 41 may be positioned below the water surface. One or more of the spud detection point 41 may be positioned in a protective, waterproof, coil housing made of a suitable waterproof, rust-resistant material, such as plastic. Each spud detection point 41 may be provided with its own housing. Also, more than one spud detection point 41 may be provided in one housing.

The spud position detector 40 may comprise a processing unit or the like, which is arranged to receive input from spud detection points 41, communicate with the spud lifting device 20 and possibly control warning devices, such as a speaker or a lamp. The processing unit may comprise a CPU and memory, the memory comprising programming lines or instructions readable and executable by the CPU to provide the spud position detector 40 with the functionality described here. The processing unit may be a computer.

The spud detection point 41 may be a coil with a coil housing provided around coil to prevent the coil from being damaged.

Figure 2A:
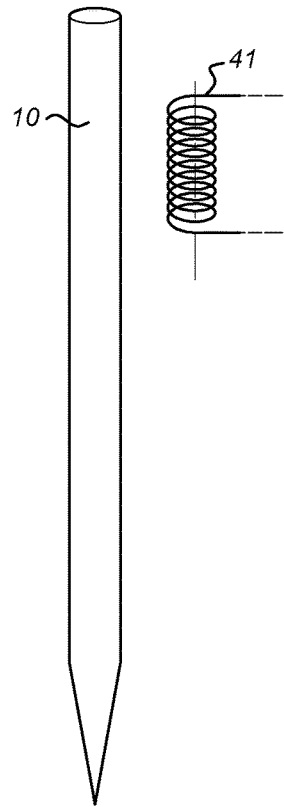
FIGS. 2a-2c schematically show a spud and a spud detection point according to different embodiments.
Figure 2B:
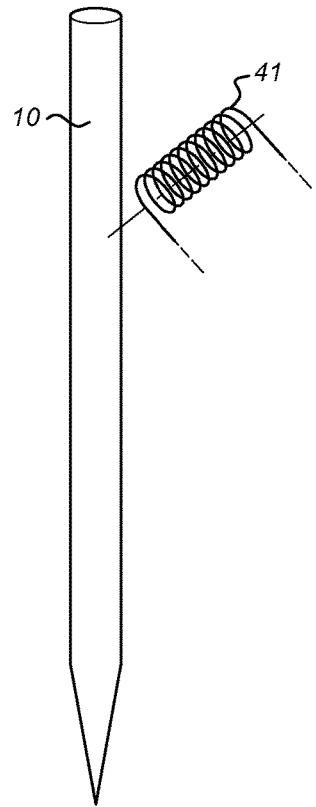
Figure 2C:
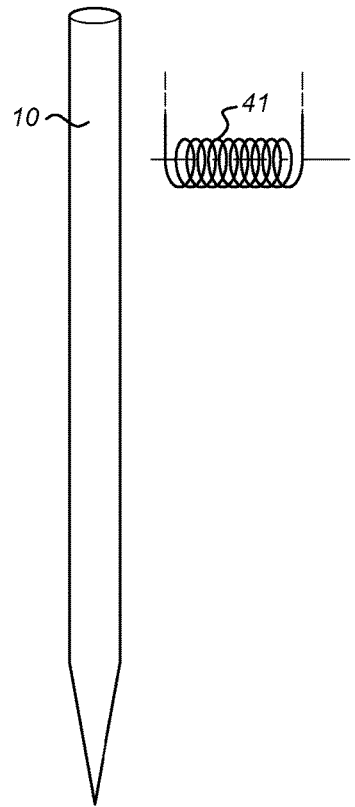

FIGS. 2a-2c show different orientations of the coils. The coil axis is defined by the axial direction of the coils, and may be orientated parallel to the spud 10 as shown in FIG. 2a, or perpendicular to the spud 10 as shown in FIGS. 2b and 2c. In FIG. 2c the coil axis is orientated in a radial direction of the spud 10, while in FIG. 2b, the coil axis is orientated in a tangential direction of the spud. FIGS. 2a-c only shows a spud detection point. However, more spud detection points 41 can be provided.

FIG. 1 shows an embodiment with three spud guiders 30. The embodiment shown in FIG. 1 relates to a situation in which the spud 10 should be supported by at least two spud guiders 30 to ensure reliable support of the spud 10. So, the spud lifting device 20 should not lift the spud 10 to a position in which the lower end 11 of the spud 10 would pass the middle spud guider 30.

Therefore, one spud detection point 41 is positioned below a predetermined spud guider 30, in this case the middle spud guider. This spud detection point 41 is referred to as a stop spud detection point. Preferably, this stop spud detection point 41 is positioned in between the predetermined spud guider 30 and the spud guider directly below the predetermined spud guider 30. When the spud position detector 40 detects passage of the lower end 11 of the spud 10 along the stop spud detection point 41 during lifting, it may generate a stop signal to stop the spud lifting device 20 and/or to warn operators via speaker 44 and/or lamp 45.

A pre-stop spud detection point 41 may be positioned below the stop spud detection point 41 to allow the spud position detector 40 to generate a pre-stop signal to warn that the lower end 11 of the spud 10 is approaching the stop spud detection point 41. The pre-stop spud detection point 41 may be located in the vicinity of the spud guider 30 directly below the predetermined spud guider 30, possible below the spud guider 30 directly below the predetermined spud guider 30. When the spud position detector 40 detects passage of the lower end 11 of the spud 10 along the pre-stop spud detection point 41 during lifting, it may generate a pre-stop signal, for instance to slow down the lifting device and/or to warn operators.

The spud position detector 40 may further comprise a speaker 44 and/or a lamp 45, or be arranged to communicate with these, to generate an audible and/or visible pre-stop and/or stop signal.

In general, the spud position detector 40 may comprise at least two spud detection points, a stop spud detection point 41 and a pre-stop spud detection point 41, the last being positioned below the first.

If the pre-stop detection point detects that there is no longer enough steel in its vicinity, this will trigger generation of a pre-stop signal to indicate that the lower end 11 of the spud 10 has passed the pre-stop detection point 41.

The spud position detector 40 may send this pre-stop signal to the spud lifting device 20 in response to which the spud lifting device 20 will slow down the lifting of the spud.

At the same time or alternatively, the spud position detector 40 may generate a pre-stop alarm signal, for instance an audible and/or visual alarm signal using speaker 44 and/or a lamp 45, which is noticeable for an operator. The operator may decide to stop or slow down the lifting process.

If the lifting process is not stopped, after some time the stop spud detection point 40 that there is no longer enough steel in its vicinity, which will trigger the generation of a stop signal to indicate that the lower end 11 of the spud 10 has passed the stop spud detection point. The stop signal may be send to the lifting device 20 to stop the lifting device 20. Again at the same time or alternatively, the spud position detector 40 may generate a stop alarm signal, for instance an audible and/or visual alarm signal using speaker 44 and/or a lamp 45, which is noticeable for an operator. The operator may decide to stop the lifting process in response to this stop alarm signal.

Descriptions above are intended to be illustrative, not limiting. Thus, it will be apparent to one skilled in the art that modifications may be made to the invention as described without departing from the scope of the claims set out below.

The invention claimed is:

1. A vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position wherein the vessel further comprises a spud position detector having at least one coil positioned at one or more predetermined spud detection points along the spud path below the water surface to detect passage of the lower end of the spud along the one or more predetermined spud detection points positioned at predetermined heights, wherein at least a stop spud detection point is positioned below a predetermined spud guider and/or above a spud guider positioned below the predetermined spud guider, wherein at least one pre-stop spud detection point is positioned below the stop spud detection point, and wherein the spud position detector is arranged to generate a pre-stop signal when during lifting passage of the lower end of the spud is detected along the pre-stop spud detection point.

2. The vessel according to claim 1, wherein the at least one coil has a coil axis, which is substantially perpendicular to a body axis of the spud.

3. The vessel according to claim 1, wherein the at least one coil has a coil axis which is substantially parallel to the body axis of the spud.

4. The vessel according to claim 1, wherein the spud position detector is arranged to generate a stop signal when during lifting passage of the lower end of the spud is detected along the stop spud detection point.

5. A method of determining the vertical position of a spud on a vessel, the vessel comprising a spud lifting device and a plurality of spud guiders, wherein the spud guiders are arranged to hold a spud in a substantial vertical orientation and to guide the spud when moving in a substantial vertical direction between a lower position in which it can engage with a water bottom and an upper position, the spud lifting device being arranged to lift the spud from the lower position to the upper position wherein the vessel further comprises a spud position detector having at least one coil positioned at one or more predetermined spud detection points, along the spud path below the water surface to detect passage of the lower end of the spud along the one or more predetermined spud detection points positioned at predetermined heights below the water surface, wherein at least a stop spud detection point is positioned below a predetermined spud guider and/or, above a spud guider positioned below the predetermined spud guider, wherein at least one pre-stop spud detection point is positioned below a stop spud detection point, and wherein the method comprises detecting passage of the lower end of the spud along a spud detection point by the spud position detector during lifting of the spud; and energizing the at least one coil, generating a stop signal when during lifting passage of the lower end of the spud is detected along the stop spud detection point, and generating a pre-stop signal when during lifting passage of the lower end of the spud is detected along the pre-stop spud detection point.

6. The vessel according to claim 4, wherein at least one pre-stop spud detection point is positioned below the stop spud detection point.

7. The vessel according to claim 6, wherein the spud position detector is arranged to generate a pre-stop signal when during lifting passage of the lower end of the spud is detected along the pre-stop spud detection point.

\* \* \* \* \*